March 18, 1952  R. H. SHARPE  2,589,440
THRESHER WITH SUCTION AND BLAST FANS MOUNTED IN HOUSING
Filed Aug. 21, 1946  3 Sheets-Sheet 1
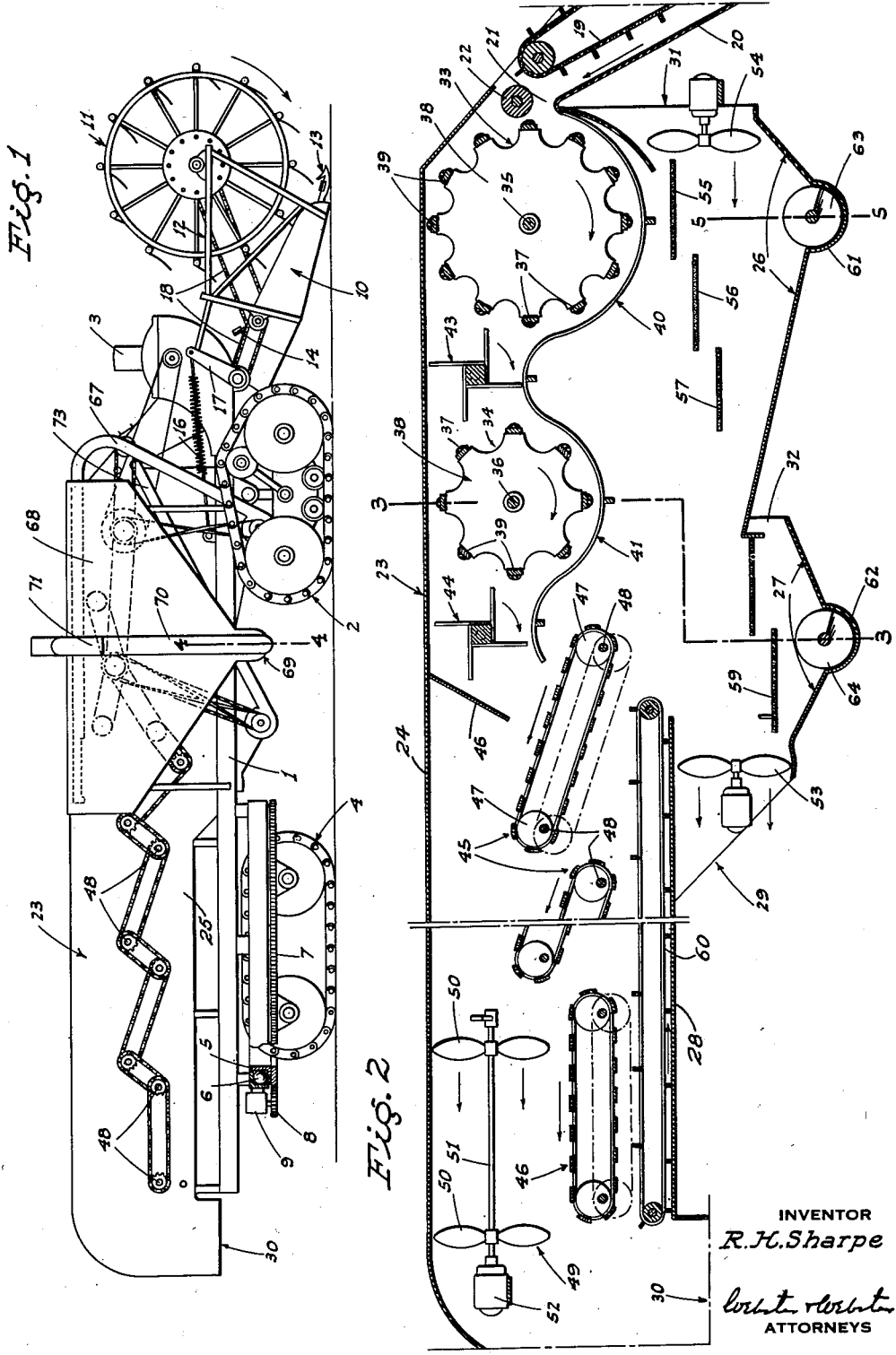
INVENTOR
R. H. Sharpe
ATTORNEYS

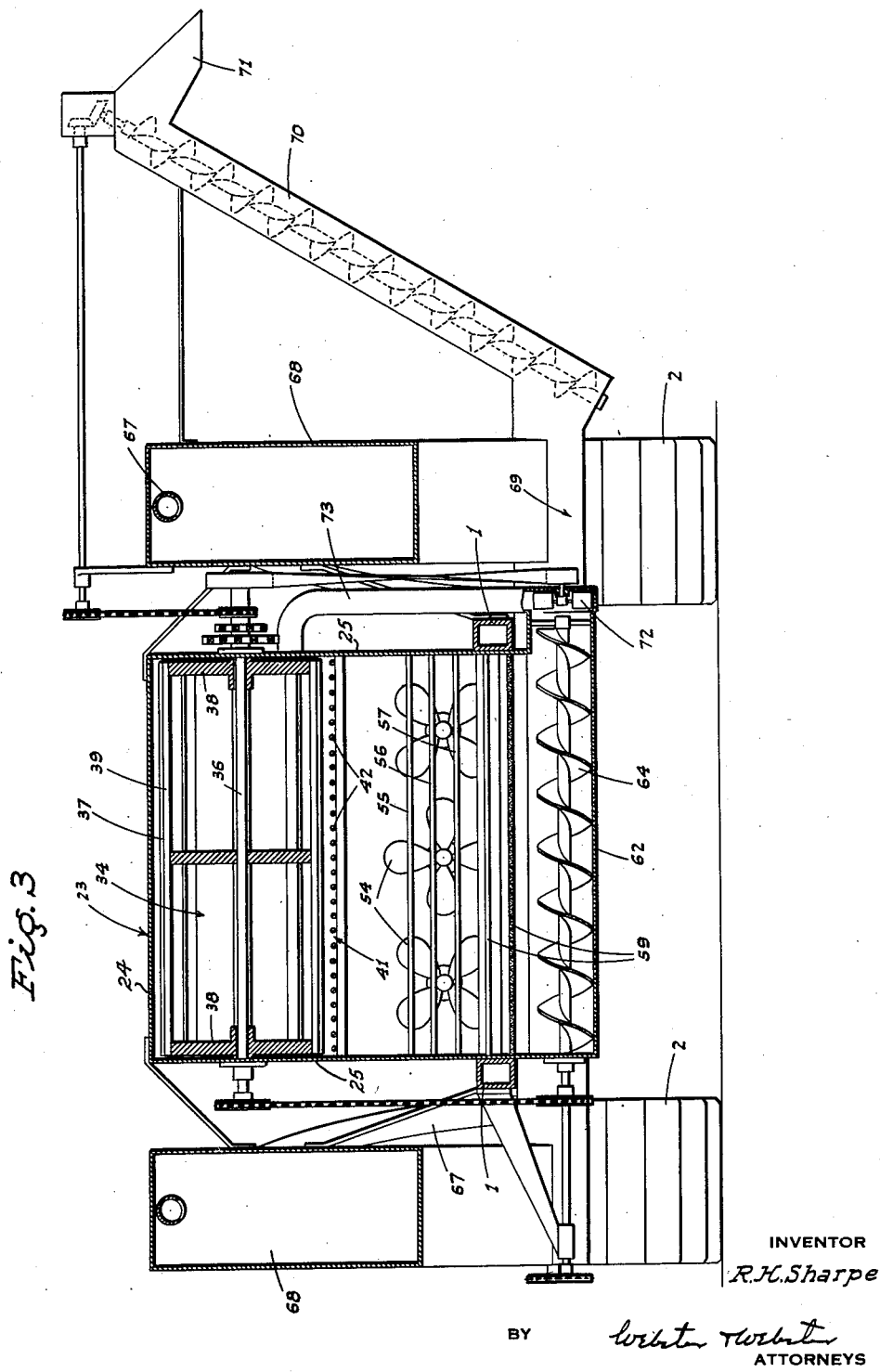

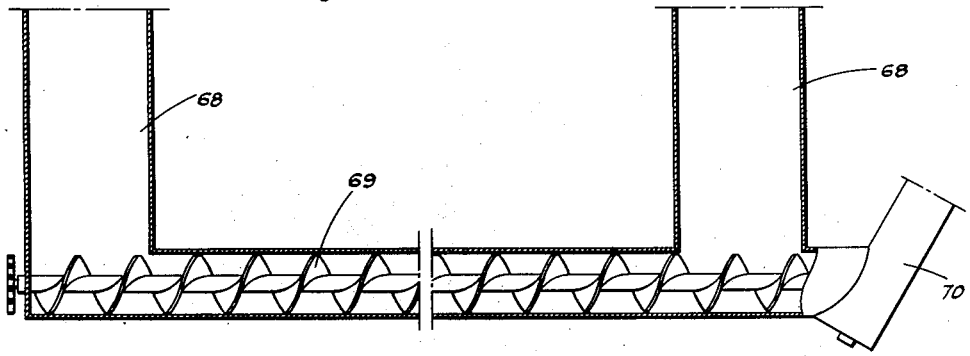
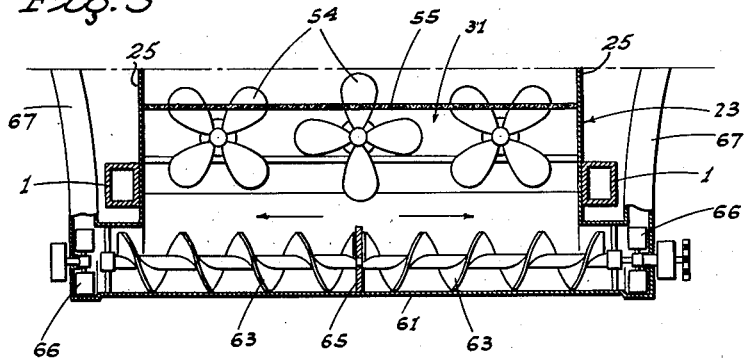
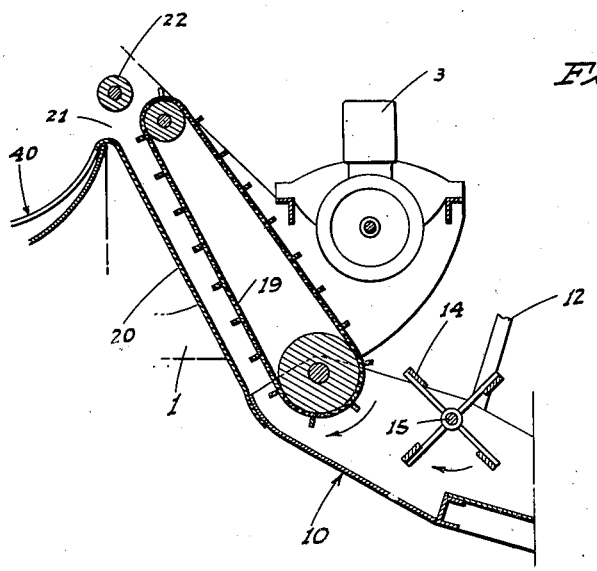

Patented Mar. 18, 1952

2,589,440

UNITED STATES PATENT OFFICE 2,589,440

THRESHER WITH SUCTION AND BLAST FANS MOUNTED IN HOUSING

Robert H. Sharpe, Stockton, Calif.

Application August 21, 1946, Serial No. 692,032

2 Claims. (Cl. 130—27)

1

This invention is directed to, and it is an object to provide, a self-propelled combined harvester especially designed for the harvesting of rice, although obviously adaptable for use on other types of grain crops.

Another object of the invention is to provide a harvester which includes a novel threshing and separating assembly whereby highly effective separation of the grain and chaff is accomplished.

A further object of the invention is to provide a harvester, as in the preceding paragraph, in which said assembly embodies, in unique assembly, a plurality of threshing cylinder units, staged separator screens, endless separator conveyors, and power driven blowers.

An additional object of the invention is to provide a harvester including a novel arrangement of grain receiving bins, and a common feed leading from said bins operative to deliver the grain from the bins to a transport vehicle alongside the harvester.

A further object of the invention is to provide a practical harvesting implement, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the harvester.

Fig. 2 is an enlarged fragmentary longitudinal sectional elevation illustrating particularly the threshing and separating chamber, and the working parts therein.

Fig. 3 is a cross section on line 3—3 of Fig. 2.

Fig. 4 is a fragmentary cross section on line 4—4 of Fig. 1.

Fig. 5 is a fragmentary cross section on line 5—5 of Fig. 2.

Fig. 6 is an enlarged fragmentary longitudinal section showing the conveying arrangement between the harvesting unit and the forward end of the threshing and separating chamber.

Referring now more particularly to the characters of reference on the drawings, the harvester comprises an elongated main frame, indicated generally at 1; said main frame being supported, adjacent its forward ends, by means of a pair of transversely spaced, driven crawler track units, indicated generally at 2. The crawler track units are driven from an engine 3 mounted on the frame at its forward end; the driving connections between the engine 3 and crawler track units 2 being of any suitable type.

2

Adjacent but short of its rear end the main frame 1 is supported by a steerably mounted idler crawler track unit, indicated generally at 4. The crawler track unit 4 is mounted in connection with a turntable 5 supported by bearings 6. The turntable 5 includes a ring gear 7 driven through the medium of a pinion 8 by an electric motor 9 mounted in connection with the stationary portion of the turntable. The electric motor 9 is energized by an engine-driven generator and supply circuit (not shown). It will be seen, however, that upon actuation of the electric motor 9, which is of reversible type, that the crawler track unit 4 will be effectively steered, with consequent steering of the implement.

The implement is fitted, at its forward end, with a forwardly projecting, floatably mounted harvesting unit, indicated generally at 10, which harvesting unit includes a driven pick-up reel 11 carried in a supporting frame 12. The harvesting unit also includes a transversely extending sickle bar 13 working along the ground below and in cooperative relationship to the pick-up reel 11. Rearwardly of the sickle bar 13 the harvesting unit 10 includes a transversely extending rotary paddle-type feeder 14 including a driven center shaft 15. The harvesting unit 10 is counterbalanced by a heavy-duty tension spring 16 which works in connection with a radial arm 17 fixed relative to the upper and pivoted end portion of said harvesting unit. The pick-up reel 11, sickle bar 13, and rotary feeder 14, are driven from the engine 3 by connections, shown in part at 18. From the floatably mounted harvesting unit 10 the cut grain is fed by the feeder 14 into an endless bottom feed conveyor 19, which works in cooperation with an upwardly inclined conveyor trough 20. The endless bottom feed conveyor 19 delivers through a horizontal transverse throat 21, defined at the top by a deflector roller 22, into the forward end of a threshing and separating chamber which is formed by a longitudinally elongated housing 23, carried by the main frame 1 and extending for substantially the full length of the latter.

The housing 23 includes a top plate 24, side plates 25, and a bottom formed as follows:

The bottom of the housing 23, i. e. the bottom of the threshing and separating chamber, comprises a pair of transverse valleys 26 and 27, the valley 26 being disposed at the head of the housing 23, while the valley 27 is directly rearwardly thereof. The rear portion of the bottom of the housing 23 comprises a flat table 28 disposed in lapping, vertically spaced relation above, and projecting from, the rear edge portion of the valley 27, whereby to form a rearwardly opening exhaust port 29 between said rear edge of the valley 27 and the forward portion of said table. The table 28 terminates, at its rear edge, short of the rear end of the housing 23, the latter including a down spout 30 rearwardly of said table.

An air intake opening 31 is formed in the front of the housing 23 above the forward edge of the valley 26, and the rear edge of said valley and the forward edge of the valley 27 are vertically spaced, as shown, to form another air intake opening 32; the air intake openings 31 and 32 extending transversely between the side plates 25.

A pair of transversely extending, longitudinally spaced threshing cylinders 33 and 34 are journaled in the housing 23 between the side plates 25 adjacent the forward end, and the top, of said housing. The threshing cylinders 33 and 34 are fixed on driven cross shafts 35 and 36, respectively; each of said threshing cylinders including a plurality of circumferentially spaced, radially outwardly projecting, threshing ribs 37 of resilient material, such as rubber. The threshing cylinders 33 and 34 are of open construction, as shown in Fig. 3, and include heads 38 connected by circumferentially spaced bars 39; the resilient threshing ribs 37 being fixed on the bars 39.

The threshing cylinders 33 and 34 work in cooperation with substantially semi-circular, upwardly opening concaves 40 and 41, the concaves merging at adjacent ends, as shown, and each comprising a plurality of arcuate, spaced-apart rods 42.

Rotary feeders 43 and 44 extend transversely in the housing 23 to the rear of the threshing cylinders 33 and 34; said feeders being driven in the directions indicated, and serving to feed material rearwardly from each concave as said material reaches the end of the latter.

The cut grain as fed through the throat 21 by the endless bottom feeder conveyor 19 is passed first through the concave 40 by the threshing cylinder 33; is thence delivered by the rotary feeder 43 into the concave 41; and is thence passed through the concave 41 by the threshing cylinder 34. A substantial amount of the grain is threshed by the cylinders 33 and 34, falling through the concaves 40 and 41 for subsequent processing, as hereinafter described.

From the rear or discharge end of the concave 41 the material passing through the threshing and separating chamber is fed by the rotary feeder 44 rearwardly, whence such material falls onto the lead one of a plurality of upwardly and rearwardly inclined endless separator conveyors 45; said conveyors being driven in the direction indicated, and set to deliver one to the other. In the present instance a pair of said conveyors 45 is illustrated. A baffle 46 assures that material from the feeder 44 falls directly onto the lower end portion of the lead one of the conveyors 45.

The rearmost one of the endless separator conveyors 45 discharges onto a horizontal endless separator conveyor 46, which in turn discharges into the down spout 30.

The endless separator conveyors 45 and 46 are of perforate or cleated type so that grain which is free of the chaff may fall through said conveyors onto the table 28. The endless separator conveyors 45 and 46 are unique in their construction, which produces an up and down reciprocation or shaking of the conveyors upon travel thereof, assuring of complete separation of grain and chaff, the chaff ultimately delivering into the down spout 30, while the grain falls onto the table 28 for further processing, as will hereinafter appear. The conveyors 45 and 46 accomplish such up and down shaking motion by reason of the fact that each such conveyor includes eccentric pulleys 47 symmetrically disposed on end cross shafts 48, so that upon driving of said shafts symmetrical eccentric movement of the pulleys 47 is produced simultaneously with advancing of the conveyor.

To facilitate the exit of chaff out of the housing 23 and from the separating conveyors 45 and 46, a transverse bank of suction fan units 49 is mounted in said housing directly above the endless separator conveyor 46; each of such suction fan units including a multiple fan 50 on a longitudinal shaft 51, driven by an electric motor 52. A similar bank of motor-driven, suction fan units 53, but of single fan type, is mounted in the exhaust port 29. A bank of motor-driven blowers 54 is mounted in the air intake opening 31. As indicated by the arrows, the fan units 49 and 53 discharge rearwardly, whereby to create suction in the threshing and separating chamber, while the bank of blowers 54 delivers air under pressure, i. e. a rearward air flow through said chamber from its open forward end.

A plurality of rearwardly staged, i. e. rearwardly and downwardly stepped, separator screens, indicated at 55, 56, 57, 58, and 59, are mounted in the housing 23; said separator screens extending horizontally and transversely between the side plates 25, and being of substantial width lengthwise of the implement. The separator screens are disposed so that the separator screens 55, 56, and 57 are above the valley 26 and are arranged in lapping relation one to the other, as shown. The separator screens 58 and 59 are above the valley 27, and are likewise lapped, as shown. Grain as threshed by the threshing cylinders 33 and 34, and which falls through the concaves 40 and 41, is received by the separator screens and passes therethrough to the valleys 26 and 27; any chaff which may accompany such grain being retarded by the separator screens and carried rearwardly thereof to pass out of the exhaust port 29, under the influence of the air stream flowing across said separator screens between the bank of blowers 54 and the bank of suction fan units 53.

The grain which drops downwardly from the endless separator conveyors 45 and 46 falls, as previously indicated, onto the table 28, whence it is swept forwardly by a cleat-type, endless, bottom feed conveyor 60 working in cooperation with said table. In this manner grain from the table 28 is fed off the feed edge of said table, and falls downwardly through the separator screen 58 or 59 into the valley 27.

The transverse valleys 26 and 27 are formed, at the bottom thereof, with transverse troughs 61 and 62, respectively. A transversely extending auger conveyor 63 runs in the trough 61, while a similar conveyor 64 runs in the trough 62. The auger conveyor 63 is double-ended, i. e. one-half feeds in one direction and the other half feeds in the opposite direction, as clearly shown in Fig. 5; said opposite end portions of the auger conveyor 63 being separated by a divider plate 65.

The auger conveyor 63 feeds the separated grain from the transverse valley 26 in opposite directions into impellers 66, which in turn deliver the grain through ducts 67 leading to and discharging into V-bottomed bins 68 mounted on opposite sides of the housing 23 adjacent the forward end thereof. The grain 9 delivered into the bins 68 is received at the bottom thereof by a common, cross conveyor 69 of auger type. The cross conveyor 69 feeds the grain from the bottoms of the bins 68 laterally of the implement into the lower end of an upwardly and outwardly inclined elevator conveyor 70, likewise of auger type. At its upper end the conveyor 70 delivers into a discharge spout 71. The spout 71 is adapted to discharge into a grain receiving body of a vehicle (not shown) alongside the harvester.

The grain as received in the transverse valley 27 is fed by the auger conveyor 64 laterally of the implement to an impeller 72 at one end of said auger conveyor 64; said impeller 72 in turn feeding the grain through a duct 73 which extends to, and discharges into, the throat 21 for repassage through the threshing and separating chamber. The reason for this repassage of the grain from valley 27 is that said latter valley receives grain which is not wholly free of chaff.

The various rotary parts of the implement within the threshing and separating chamber, together with the several auger conveyors, are driven from exteriorly of the housing 23 by suitable and generally conventional driving connections, as illustrated.

With the above described harvester grain, such as rice, can be harvested readily, effectively, and in a practical and economical manner; the separated grain being clean and free of chaff.

As the harvester is self-propelled, it requires no separate tractor for use therewith; the operator's station and his controls being positioned at any convenient point, but here eliminated for the purpose of avoiding unnecessary disclosure, as no claim is made thereto.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A threshing and separating assembly comprising an elongated housing, the bottom of which includes two longitudinally spaced valleys extending transversely of the housing and each valley terminating at its bottom in a transverse trough, a conveyor in each trough, a grated concave and threshing cylinder unit disposed in a plane above and in spaced relation to each of the valleys, the ends of the housing being freely open for their full width between the side walls of the housing whereby to form a continuous open passage from end to end of the housing between the valleys and units, and means disposed along the width of the opening in the front end of the housing for directing a blast of air through said passage, there being an intermediate opening formed in the bottom of the housing between the valleys and extending for the full width between the side walls of the housing and opening into the housing in a direction toward the opening in the rear end of said housing, and air suction means disposed along said rear end opening.

2. An assembly as in claim 1, including an open slot conveyor disposed to the rear of the concave and threshing units in a position to receive threshed material from the rear end of the rearmost unit, a table below said conveyor, the forward end of the table overhanging the rearmost valley and terminating at a point in a vertical plane intermediate those in which lie the rear end opening and the intermediate opening, and a drag conveyor movable over the table and effective to move material off the forward end of said table.

ROBERT H. SHARPE.

REFERENCES CITED

The following references are of record in the file of this patent:

UNITED STATES PATENTS

| Number | Name | Date |
|---|---|---|
| 189,545 | Ballard et al. | Apr. 17, 1877 |
| 482,494 | Anderson | Sept. 13, 1892 |
| 596,573 | Chatterton | Jan. 4, 1898 |
| 629,758 | Abell | Aug. 1, 1899 |
| 666,244 | Galland | Jan. 15, 1901 |
| 756,728 | Stewart | Apr. 5, 1904 |
| 762,639 | Kramer | June 14, 1904 |
| 769,948 | Kramer | Sept. 13, 1904 |
| 796,117 | Dunkelberger | Aug. 1, 1905 |
| 826,988 | Bradbury | July 24, 1906 |
| 895,153 | Boyer | Aug. 4, 1908 |
| 939,449 | Silver | Nov. 9, 1909 |
| 1,007,522 | Branch | Oct. 31, 1911 |
| 1,009,971 | Hystad | Nov. 28, 1911 |
| 1,082,191 | George | Dec. 23, 1913 |
| 1,172,011 | Cooper | Feb. 15, 1916 |
| 1,342,806 | Gross | June 8, 1920 |
| 1,625,953 | Lundquist | Apr. 26, 1927 |
| 2,036,239 | Suwalkowski | Apr. 7, 1936 |
| 2,262,453 | Dray | Nov. 11, 1941 |
| 2,266,805 | Ronning | Dec. 23, 1941 |
| 2,292,650 | Oehler et al. | Aug. 11, 1942 |